United States Patent
Metzger et al.

(10) Patent No.: US 8,517,612 B2
(45) Date of Patent: Aug. 27, 2013

(54) BEARING OILING SYSTEM

(75) Inventors: Mark A. Metzger, South Windsor, CT (US); Michael Gantt, Granby, CT (US)

(73) Assignee: United Technologies Corporation, Hartford, CT (US)

( * ) Notice: Subject to any disclaimer, the term of this patent is extended or adjusted under 35 U.S.C. 154(b) by 197 days.

(21) Appl. No.: 13/173,086

(22) Filed: Jun. 30, 2011

(65) Prior Publication Data

US 2013/0004109 A1    Jan. 3, 2013

(51) Int. Cl.
*F16C 33/66* (2006.01)

(52) U.S. Cl.
USPC .......................................... 384/475

(58) Field of Classification Search
USPC .................................. 384/473–475
See application file for complete search history.

(56) References Cited

U.S. PATENT DOCUMENTS

| | | | |
|---|---|---|---|
| 3,531,167 A * | 9/1970 | Blea et al. ............. | 384/475 |
| 4,294,069 A | 10/1981 | Camp | |
| 4,334,720 A * | 6/1982 | Signer ............. | 384/475 |
| 4,414,807 A | 11/1983 | Kerr | |
| 4,463,994 A | 8/1984 | Eliason et al. | |
| 5,106,209 A | 4/1992 | Atkinson et al. | |
| 6,141,951 A | 11/2000 | Krukoski et al. | |
| 6,409,464 B1 | 6/2002 | Fisher et al. | |
| 6,473,705 B1 | 10/2002 | Conners | |
| 7,931,407 B2 | 4/2011 | Begin et al. | |
| 2006/0062504 A1 | 3/2006 | Wilton et al. | |
| 2009/0245997 A1 | 10/2009 | Hurwitz et al. | |
| 2010/0269512 A1 | 10/2010 | Morford et al. | |

* cited by examiner

*Primary Examiner* — Thomas R Hannon
(74) *Attorney, Agent, or Firm* — Kinney & Lange, P.A.

(57) ABSTRACT

An inner ring of an under race lubricated bearing assembly that includes an outer surface, an inner surface, and an inner race formed on the outer surface of the inner ring. A plurality of circumferentially spaced axial slots is formed on the inner surface of the inner ring, and a first set of circumferentially spaced partial circumferential slots is formed on the inner surface of the inner ring adjacent a first end of the inner ring. Each partial circumferential slot intersects at least one of the axial slots. The inner ring also includes a first set of radial holes, where each radial hole extends from the outer surface of the inner ring to one of the partial circumferential slots.

20 Claims, 6 Drawing Sheets

BEARING OILING SYSTEM

BACKGROUND

The present invention relates to lubrication in bearing assemblies, and in particular, to high speed bearing assemblies with under race lubrication used in gas turbine engines.

Bearing assemblies are integral to the performance and speed of gas turbine engines. To reduce wear on bearing assemblies, it is essential that lubricating fluid, such as oil, be delivered to the bearing assemblies to keep them cool and clean. Under race oil delivery (channeling oil under the bearing) is a method for delivering oil to bearing assemblies in gas turbine engines that uses less oil to achieve bearing temperatures that are cooler and more uniform than those reached by other less-oil-efficient methods, such as using side scoops, wings and side jets to direct oil into the bearing assemblies.

A known implementation of under race oil delivery to prior art bearing assemblies in aerospace applications is to utilize axial grooves or slots formed on an inside surface of an inner ring of the prior art bearing assembly that extend the entire inside length of the prior art inner ring. Radial ports or holes extend through a thickness of the prior art inner ring and intersect the axial slots. After the prior art inner ring and its corresponding bearing assembly have been mounted to a shaft, lubricating oil is directed into the axial slots where at least a portion of the oil enters the radial holes and exits inside the prior art bearing assembly where lubrication is needed. The remainder of the oil continues through the axial slots where it is directed to other parts that mate with the prior art bearing assembly.

SUMMARY

According to the present invention, an inner ring of an under race lubricated bearing assembly that includes an outer surface, an inner surface, and an inner race formed on the outer surface of the inner ring. A plurality of circumferentially spaced axial slots is formed on the inner surface of the inner ring, and a first set of circumferentially spaced partial circumferential slots is formed on the inner surface of the inner ring adjacent a first end of the inner ring. Each partial circumferential slot intersects at least one of the axial slots. The inner ring also includes a first set of radial holes, where each radial hole extends from the outer surface of the inner ring to one of the partial circumferential slots.

DETAILED DESCRIPTION

As gas turbine engines are designed to run at higher speeds, prior art bearing assemblies are running into speed limitations due to high centrifugal hoop stresses concentrating around the oil delivery features formed on the inside surface of prior art inner rings of prior art bearing assemblies, such as the axial slots and radial holes discussed above. The highest centrifugal hoop stress concentrations have been found surrounding the portions of prior art inner rings where radial holes intersect axial slots.

In general, the present invention relates to an inner ring of an under race lubricated bearing assembly. In addition to the inner ring, the bearing assembly includes an outer ring and bearing elements. An outer race is formed on the outer ring and an inner race is formed on the inner ring. The bearing elements are disposed between the inner race and the outer race and are adapted to rotatably move between the inner ring and the outer ring about a central axis of the bearing assembly. The inner ring includes an outer surface, an inner surface, a plurality of circumferentially spaced axial slots, a first set of circumferentially spaced partial circumferential slots, and a first set of radial holes. The plurality of circumferentially spaced axial slots is formed on the inner surface of the inner ring and the first set of circumferentially spaced partial circumferential slots is also formed on the inner surface of the inner ring. Each partial circumferential slot intersects at least one of the axial slots. In some embodiments, at least one axial slot is not intersected by a partial circumferential slot. Each radial hole extends from the outer surface of the inner ring to one of the partial circumferential slots.

After the inner ring is assembled into the bearing assembly, and the bearing assembly is mounted to an engine shaft, lubricating fluid (such as oil) is directed into the plurality of circumferentially spaced axial slots while the engine shaft is rotated. The lubricating fluid will then flow down the axial slots and lubricating fluid will flow into the partial circumferential slots from the axial slots intersected by the partial circumferential slots. All of the lubricating fluid that flows into the partial circumferential slots will be forced (by centrifugal forces) into the radial holes and into the bearing assembly where lubrication is needed. In the embodiments where at least one axial slot is not intersected by the partial circumferential slots, the lubricating fluid in the at least one non-intersected axial slot is directed across the inner surface of the inner ring and away from the bearing assembly where it can be used to lubricate and cool other parts of the engine. Because the partial circumferential slots of the inner ring reduce the high hoop stress concentrations prevalent in the prior art from forming, the bearing assembly and engine are able to attain higher speeds than in the prior art. Along with attaining higher speeds than prior art bearings, the present disclosure occupies less axial space inside a gas turbine engine compartment, axial space being a very costly commodity.

Figure 1:
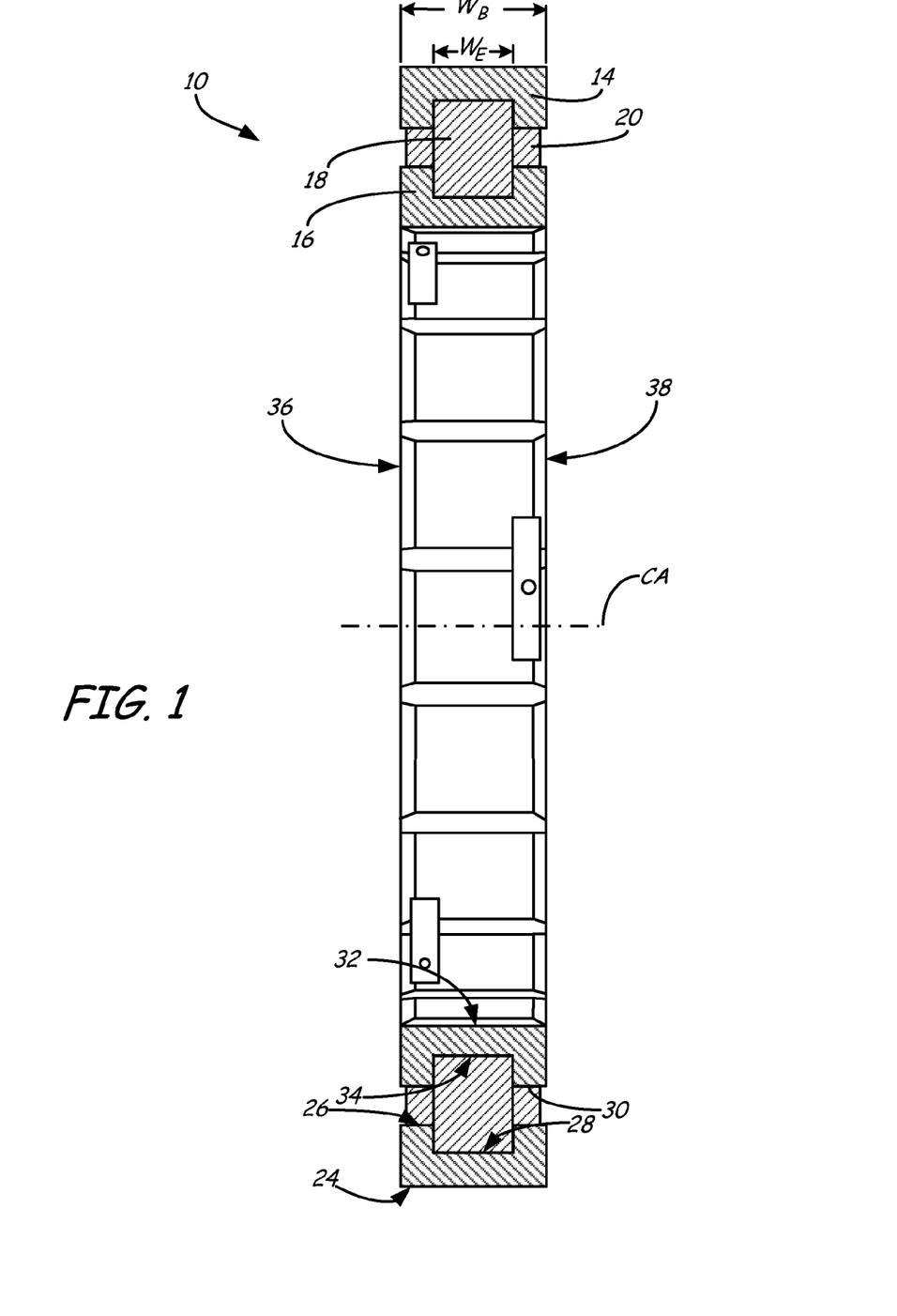
FIG. 1 is a partial cross sectional side view of an embodiment of a bearing assembly.

FIG. 1 is a partial cross sectional side view of an embodiment of bearing assembly 10. Bearing assembly 10 includes central axis CA, outer ring 14, inner ring 16, bearing elements 18, bearing cage 20, and axial width $W_B$. Outer ring 14 includes outer surface 24, inner surface 26, and outer race 28. Inner ring 16 includes outer surface 30, inner surface 32, inner race 34, first end 36, and second end 38. Bearing elements 18 include axial width $W_E$.

Outer ring 14 is centered on central axis CA with outer surface 24 facing radially outward from central axis CA and inner surface 26 facing radially inward towards central axis CA. Inner surface 26 is radially more proximate to central axis CA than outer surface 24. Outer race 28 is formed on inner surface 26 and spans an entire circumference of inner surface 26. Outer race 28 is adapted to receive a portion of each bearing element 18. Inner ring 16 is disposed concentrically inside outer ring 14. Outer surface 30 of inner ring 16 faces radially outward from central axis CA and inner surface 32 faces radially inward towards central axis CA. Inner surface 32 is radially more proximate to central axis CA than outer surface 30. Inner surface 32 and outer surface 30 extend axially from first end 36 to second end 38. Inner race 34 is formed on outer surface 30 between first end 36 and second end 38 and spans an entire circumference of outer surface 30. Inner race 34 is also adapted to receive a portion of each bearing element 18.

Bearing elements 18 are disposed between outer race 28 of outer ring 14 and inner race 34 of inner ring 16. Bearing elements 18 rotatably move along outer race 28 and inner race 34 about central axis CA. Bearing elements 18 are selected from the group consisting of roller bearings, ball bearings and tapered bearings. Bearing elements 18 shown in the embodiment of FIG. 1 are roller bearings. Bearing cage 20 is disposed between outer ring 14 and inner ring 16 and equally spaces bearing elements 18 apart from one another such that each bearing element 18 rotates along outer race 28 and inner race 34 without contacting any other bearing element 18.

Axial width $W_B$ of bearing assembly 10 is the distance that bearing assembly 10 extends parallel to central axis CA. Axial width $W_E$ of bearing elements 18 is the distance bearing elements 18 extend parallel to central axis CA once bearing elements 18 have been assembled into bearing assembly 10. Axial width $W_B$ divided by axial width $W_E$ produces a ratio whose value is less than 2. In the embodiment of FIG. 1, the ratio between axial width $W_B$ and axial width $W_E$ is 1.86.

With bearing assembly 10 assembled, inner ring 16 can be rotated inside outer ring 14 on bearing elements 18 about central axis CA. Additionally, outer ring 14 can be rotated around inner ring 16 on bearing elements 18 about central axis CA. Bearing assembly 10 can be mounted onto a shaft by sliding bearing assembly on and around the shaft with inner surface 32 of inner ring 16 contacting the shaft. Bearing assembly 10 can be used to rotatably join a shaft to a larger assembly, such as a gas turbine engine. Because the ratio between axial width $W_B$ of bearing assembly 10 and axial width $W_E$ of bearing elements 18 is less than 2, bearing assembly 10 uses less material than prior art bearing assemblies and will occupy less space on the shaft than prior art bearing assemblies.

Figure 2:
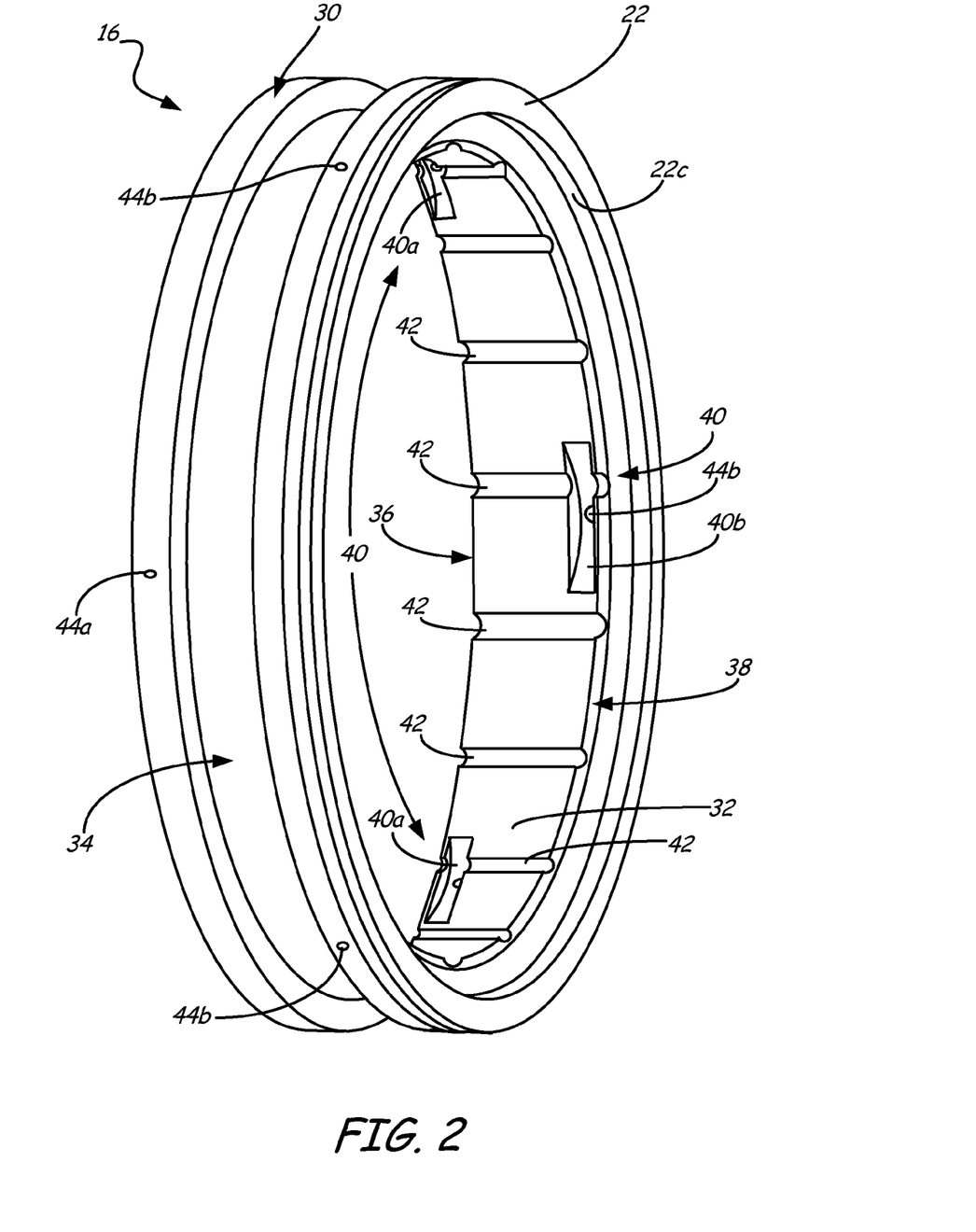
FIG. 2 is a perspective view of an inner ring of the bearing assembly of FIG. 1.

FIG. 2 is a perspective view of inner ring 16 of bearing assembly 10 disclosed in FIG. 1. Inner ring 16 includes outer surface 30, inner surface 32, inner race 34, first end 36, and second end 38. In the embodiment of FIG. 2, inner ring 16 further includes partial circumferential slots 40, a plurality of axial slots 42, and radial holes 44. Partial circumferential slots 40 are grouped into first set 40a and second set 40b. Radial holes 44 are grouped into first set 44a and second set 44b.

Partial circumferential slots 40 are formed on inner surface 32 of inner ring 16 between first end 36 and second end 38 and extend radially into inner ring 16 without penetrating outer surface 30 or inner race 34. Partial circumferential slots 40 in first set 40a are formed on inner surface 32 adjacent first end 36 of inner ring 16. Partial circumferential slots 40 in second set 40b are formed on inner surface 32 adjacent second end 38 of inner ring 16. "Partial circumferential slots 40a" references partial circumferential slots 40 from first set 40a, and "partial circumferential slots 40b" references partial circumferential slots 40 from second set 40b. Partial circumferential slots 40a and partial circumferential slots 40b are similar in geometry and only differ in position on inner surface 32. Each partial circumferential slot 40 is equally spaced apart circumferentially from one another along inner surface 32. Partial circumferential slots 40a may be staggered with partial circumferential slots 40b along inner surface 32. The embodiment of FIG. 2 has (though not all can be seen) three partial circumferential slots 40a and three partial circumferential slots 40b, with every partial circumferential slot 40a spaced circumferentially on inner surface 32 between two partial circumferential slots 40b and vice versa. Each partial circumferential slot intersects at least one axial slot 42 formed on inner surface 32.

A plurality of axial slots 42 are formed on inner surface 32 and circumferentially spaced on inner surface 32. Each axial slot 42 extends straight across inner surface 32 from first end 36 to second end 38. Each axial slot 42 extends radially into inner ring 16 a distance less than each partial circumferential slot 40 extends into inner ring 16. Each radial hole 44 extends from outer surface 30 of inner ring 16 to one partial circumferential slot 40. Radial holes 44 are grouped into first set 44a and second set 44b. "Radial holes 44a" references radial holes 44 from first set 44a, and "radial holes 44b" references radial holes 44 from second set 44b. The embodiment of FIG. 2 shows three radial holes 44a and three radial holes 44b. Each radial hole 44a extends from outer surface 30 adjacent first end 36 to one of partial circumferential slots 40a. Each radial hole 44b extends from outer surface 30 adjacent second end 38 to one of partial circumferential slots 40b.

As discussed below in detail, partial circumferential slots 40, axial slots 42, and radial holes 44 function together as a series of fluid passages to deliver lubricating fluid to bearing assembly 10 with a geometry that prevents hoop stresses from concentrating in inner ring 16. Once inner ring 16 has been mounted to a shaft, lubricating fluid is directed into the plurality of circumferentially spaced axial slots 42 and will then flow down axial slots 42, and lubricating fluid will flow into partial circumferential slots 40 from axial slots 42 intersected by partial circumferential slots 40. All of the lubricating fluid that flows into partial circumferential slots 40 will be forced into radial holes 44 and into bearing assembly 10 where lubrication is needed.

Figure 3:
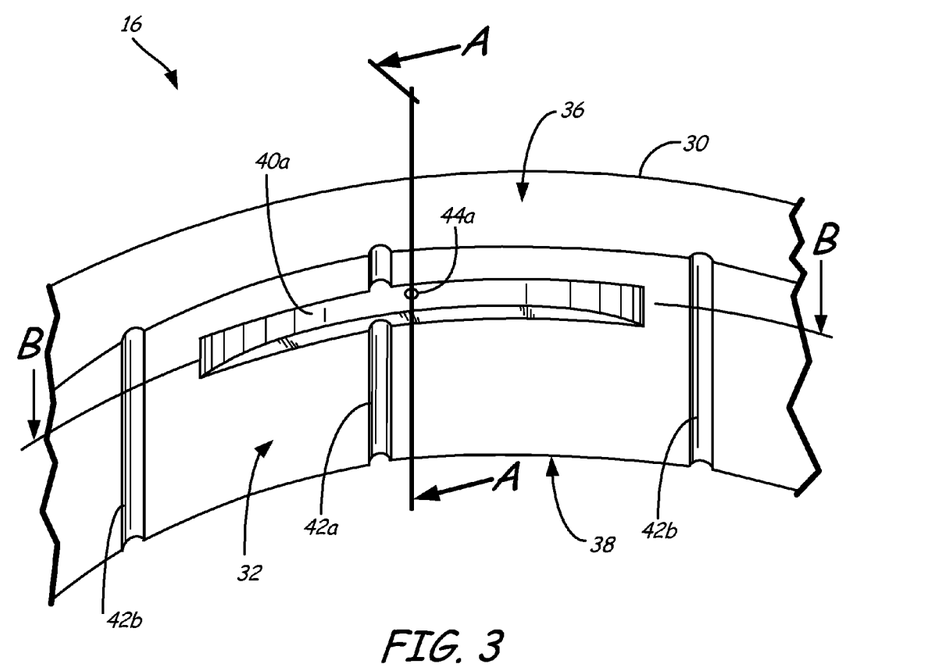
FIG. 3 is an expanded and rotated perspective view of inner surface 32, partial circumferential slot 40, axial slots 42a, and axial slots 42b from the embodiment of inner ring 16 from FIG. 2.

FIG. 3 is an expanded and rotated (90 degrees to the right) perspective view of inner ring 16 from the embodiment of FIG. 2. Inner ring 16 includes outer surface 30, inner surface 32, first end 36, second end 38, partial circumferential slot 40a, axial slots 42, and radial hole 44a. Axial slots 42 are grouped into group 42a and group 42b. "Axial slots 42a" references axial slots 42 from group 42a and "axial slots 42b" references axial slots 42 from group 42b.

Axial slots 42a extend straight across inner surface 32 from first end 36 to second end 38, each axial slot 42a intersecting one partial circumferential slot 40. In the embodiment of FIG. 3, axial slot 42a intersects partial circumferential slot 40a.

Axial slots 42b extend straight across inner surface 32 from first end 36 to second end 38 without intersecting any partial circumferential slot 40.

As discussed below in detail, axial slots 42a function to direct lubricating fluid to partial circumferential slots 40 where the lubricating fluid will be directed into bearing assembly 10. Axial slots 42b function to direct lubricating fluid across inner surface 32 of inner ring 16 from second end 38 to first end 36 of inner ring 16 and away from bearing assembly 10 where the lubricating fluid passing through axial slots 42b can be used to lubricate and cool other parts mated with bearing assembly 10 or disposed within the larger assembly incorporating bearing assembly 10.

Figure 4A:
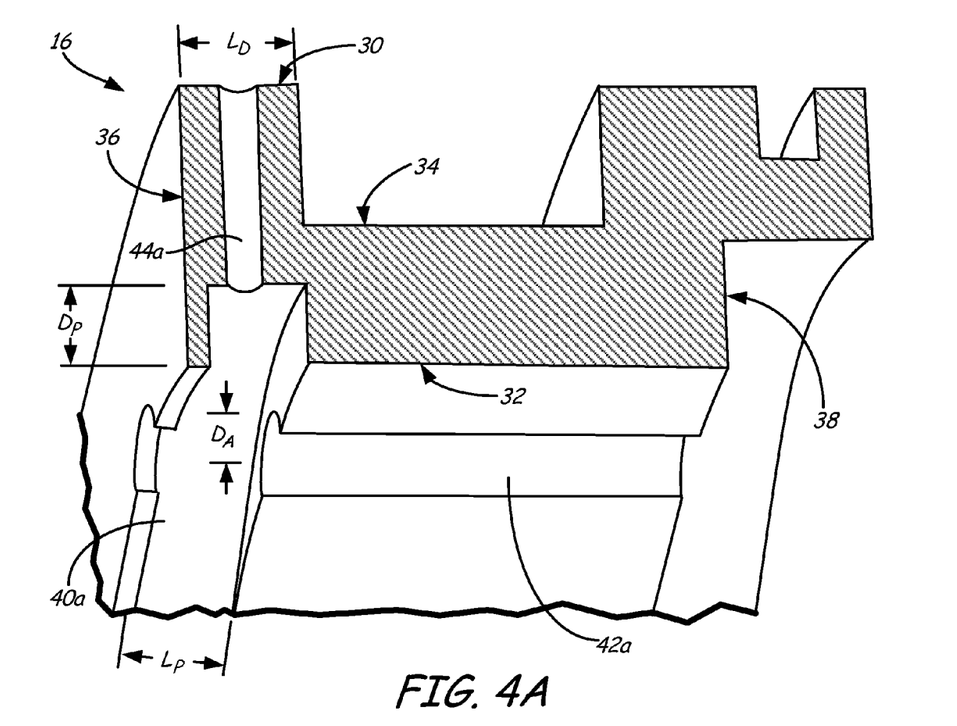
FIG. 4A is an expanded cross sectional view of the inner ring of FIG. 3 taken along line A-A.

FIG. 4A is an expanded cross sectional view of inner ring 16 of FIG. 3 taken along line A-A. In the embodiment of FIG. 4A, inner ring 16 includes outer surface 30, inner surface 32, inner race 34, first end 36, second end 38, partial circumferential slot 40a, axial slot 42a, and radial hole 44a. Partial circumferential slot 40a includes radial depth DP and axial length LP. Axial slot 42a includes radial depth DA. Outer surface 30 includes first axial length, $L_D$.

As discussed above, partial circumferential slot 40a is formed on inner surface 32 of inner ring 16 adjacent first end 36 of inner ring 16. Radial depth $D_P$ of partial circumferential slot 40a is a maximum depth that partial circumferential slot 40a extends into inner ring 16 from inner surface 32 towards outer surface 30. Radial depth $D_P$ can be measured as a radial distance between inner surface 32 and where radial hole 44a meets partial circumferential slot 40a. As discussed above, partial circumferential slot 40a extends into inner ring 16 from inner surface 32a towards outer surface 30 without penetrating outer surface 30 or inner race 34. Therefore, radial depth $D_P$ of partial circumferential slot 40a is shallow enough to prevent partial circumferential slot 40a from penetrating outer surface 30 or inner race 34. Partial circumferential slots 40b, discussed above, also include radial depth D.

Axial slot 42a is formed on inner surface 32 extending across inner surface 32 form first end 36 to second end 38 and intersecting partial circumferential slot 40a. Radial depth $D_A$ of axial slot 42a is a maximum distance that axial slot 42a extends radially into inner ring 16 from inner surface 32 towards outer surface 30. Radial depth $D_A$ of axial slot 42a is shallower than radial depth $D_P$ of partial circumferential slot 40a. Axial slots 42b, discussed above, also include radial depth $D_A$.

Inner race 34 is formed on outer surface 30 of inner ring 16 between first end 36 and second end 38 of inner ring 16. First axial length $L_D$ of outer surface 30 of inner ring 16 measures a portion of outer surface 30 between first end 36 and inner race 34. Axial length LP of partial circumferential slot 40a is a distance that partial circumferential slot 40a extends on inner surface 32 in a direction parallel to central axis CA (not shown) discussed above. In the embodiment of FIG. 4A, axial length LP of partial circumferential slot 40a is smaller than first axial length $L_D$ of outer surface 30. Radial hole 44a extends from outer surface 30 inside first axial length $L_D$ to partial circumferential slot 40a.

Figure 4B:
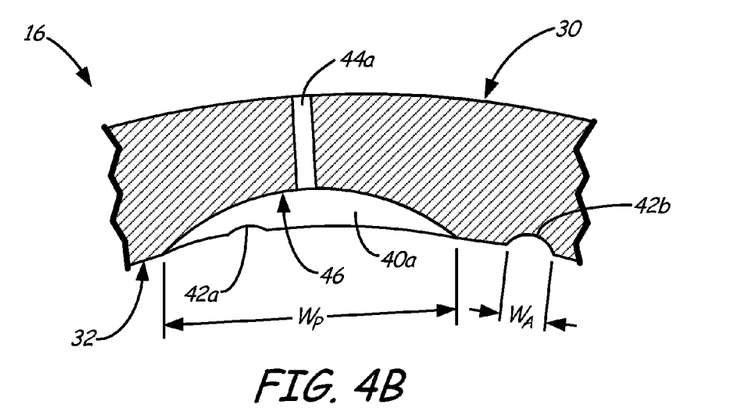
FIG. 4B is a cross sectional view of the inner ring and partial circumferential slot of FIG. 3 taken along line B-B.

Partial circumferential slot 40a, axial slot 42a, and radial hole 44a function together as a series of fluid passages to direct lubricating fluid to outer surface 30 and inner race 34. Due to its geometry, partial circumferential slot 40a allows, while inner ring 16 is in use, lubricating fluid to be directed from axial slot 42a to radial hole 44a while also preventing hoop stresses from concentrating in inner ring 16. Because partial circumferential slot 40a prevents hoop stress concentrations in inner ring 16, bearing assemblies incorporating inner ring 16, such as bearing assembly 10 discussed above, are able to reach higher speeds than bearing assemblies incorporating prior art inner rings. FIG. 4B discusses in more detail the geometry of partial circumferential slot 40a.

FIG. 4B is a cross sectional view of inner ring 16 and partial circumferential slot 40a of FIG. 3 taken along line B-B. In the embodiment of FIG. 4B, inner ring 16 includes outer surface 30, inner surface 32, partial circumferential slot 40a, axial slot 42a, axial slot 42b, and radial hole 44a. Partial circumferential slot 40a includes circumferential width $W_P$ and curved surface 46. Axial slot 42b includes circumferential width $W_A$.

Partial circumferential slot 40a is formed on inner surface 32 of inner ring 16 and extends into inner ring 16 from inner surface 32 towards outer surface 30 without penetrating outer surface 30. Radial hole 44a extends from outer surface 30 to partial circumferential slot 40a. Axial slot 42a is formed on inner surface 32 of inner ring 16 and intersects partial circumferential slot 40a. Axial slot 42b is formed on inner surface 32 and is circumferentially spaced on inner surface 32 away from axial slot 42a. Axial slot 42b does not intersect partial circumferential slot 40a and does not intersect any partial circumferential slot 40 discussed above. Circumferential width $W_P$ is a distance partial circumferential slot 40a extends along a circumference of inner surface 32 of inner ring 16. Circumferential width $W_P$ is smaller than the circumference of inner surface 32 of inner ring 16. Circumferential width $W_A$ is a distance axial slot 42b extends along the circumference of inner surface 32 of inner ring 16. Axial slots 42a and axial slots 42b are both equal in circumferential width. Circumferential width $W_A$ of axial slot 42b is smaller than circumferential width $W_P$ of partial circumferential slot 40a, thus partial circumferential slot 40a extends across more of the circumference of inner surface 32 of inner ring 16 than axial slot 42a and axial slot 42b. Curved surface 46 of partial circumferential slot 40a has a center of curvature offset from central axis CA (not shown but discussed above) and a smaller radius than inner surface 32 of inner ring 16. Curved surface 46 curves radially into inner ring 16 from inner surface 32 toward radial hole 44a. Radial hole 44a is circumferentially misaligned from axial slot 42a.

Partial circumferential slot 40a, axial slot 42a, and radial hole 44a function together as a series of under race fluid passages that directs lubricating fluid onto outer surface 30. Lubricating fluid directed into axial slot 42a will drain into partial circumferential slot 40a. Curved surface 46 of partial circumferential slot 40a will direct lubricating fluid draining into partial circumferential slot 40a from axial slot 42a into radial hole 44a. Radial hole 44a directs lubricating fluid onto outer surface 30 of inner ring 16. Due to its geometry, partial circumferential slot 40a prevents hoop stresses from concentrating in inner ring 16. Because partial circumferential slot 40a prevents hoop stress concentrations in inner ring 16, bearing assemblies incorporating inner ring 16, such as bearing assembly 10 discussed above, are able to reach higher speeds than bearing assemblies incorporating prior art inner rings.

Figure 5A:
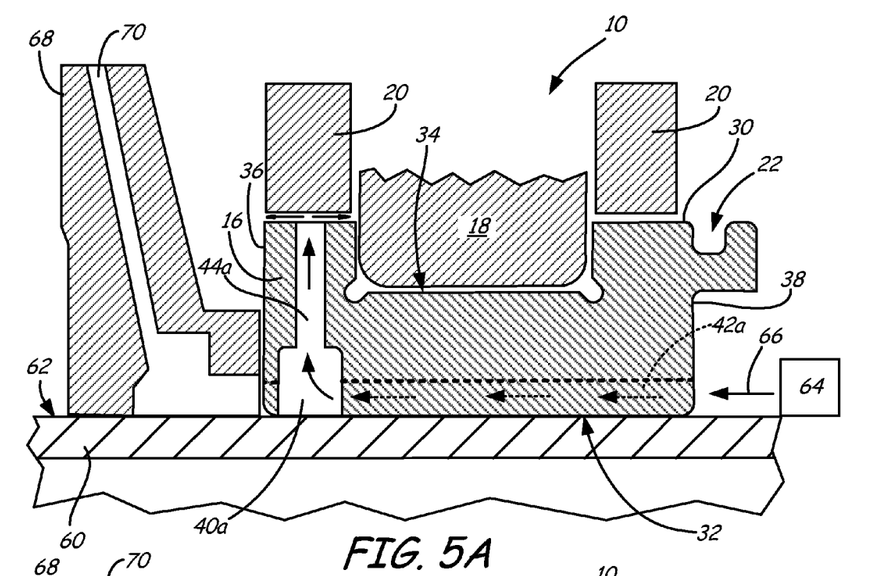
FIG. 5A is an expanded cross sectional side view of the bearing assembly of FIG. 1 mounted to a shaft adjacent a seal runner plate and lubricating fluid being directed inside the bearing assembly through an axial slot, a partial circumferential slot, and a radial hole formed in an inner ring of the bearing assembly.
Figure 5B:
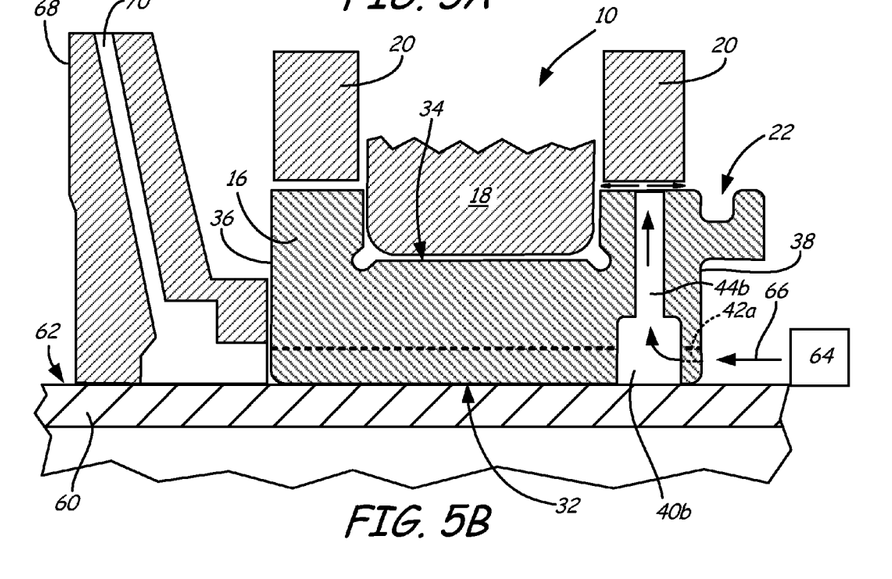
FIG. 5B is an expanded cross sectional side view of the bearing assembly of FIG. 1 mounted to the shaft of FIG. 5A adjacent a seal runner plate and lubricating fluid being directed inside the bearing assembly through an axial slot, a partial circumferential slot, and a radial hole formed in an inner ring of the bearing assembly.

FIGS. 5A and 5B are cross sectional views of bearing assembly 10 from FIG. 1 mounted around shaft 60, each view taken across bearing assembly 10 from a different circumferential orientation of bearing assembly 10. The cross sectional view of FIG. 5A is oriented on partial circumferential slot 40a and radial hole 44a. The cross sectional view of FIG. 5B is oriented on partial circumferential slot 40b and radial hole 44b. Inner ring 16 includes multiple axial slots 42a that intersect partial circumferential slots 40a and partial circumferential slots 40b. Axial slots 42a intersecting partial circumferential slots 40a do not intersect partial circumferential slots 40b. Axial slots 42a intersecting partial circumferential slots 40b do not intersect partial circumferential slots 40a. FIGS. 5A and 5B are described in detail below.

FIG. 5A is an expanded cross sectional side view of bearing assembly 10 of FIG. 1 mounted to shaft 60 adjacent seal runner plate 68. Bearing assembly 10 includes outer ring 14 (not shown), inner ring 16, bearing element 18, bearing cage 20 and axial width $W_B$. Inner ring 16 includes outer surface 30, inner surface 32, inner race 34, first end 36, second end 38, partial circumferential slot 40a, axial slot 42a (shown in phantom), and radial hole 44a. Bearing element 18 include axial width $W_E$. Shaft 60 includes outer surface 62. Annular manifold 64 supplies lubricating fluid 66 to bearing assembly 10 and includes full annular slot 70. Seal runner plate 68 includes fluid passage 72.

Outer ring 14 (not shown), inner ring 16, bearing element 18, and bearing cage 20 are assembled into bearing assembly 10 according to the disclosure of the embodiment from FIG. 1. Inner race 34 is formed on outer surface 30 of inner ring 16 between first end 36 and second 38. Partial circumferential slot 40a is formed on inner surface 32 of inner ring 16 adjacent first end 36. Axial slot 42a is formed on inner surface 32 extending from first end 36 to second end 38 and intersects partial circumferential slot 40a. Radial hole 44a extends form outer surface 30 of inner ring 16 to partial circumferential slot 40a. Radial hole 44a and axial slot 42a are misaligned circumferentially, explaining why axial slot 42a is shown in phantom in FIG. 5A. Full annular slot 70 is formed on an inside surface of manifold 64 and extends axially into a portion of annular manifold 64. Full annular slot 70 is radially deeper than axial slot 42a and axial slot 42b (not shown). Bearing assembly 10 is mounted around shaft 60 with inner surface 32 of inner ring 16 contacting outer surface 62 of shaft 60. Seal runner plate 68 is mounted around shaft 60 adjacent bearing assembly 10. Annular manifold 64 is mounted around shaft 60 adjacent bearing assembly 10 opposite seal runner plate 68 with full annular slot 70 contacting second end 38 and axial slot 42a of inner ring 16. Full annular slot 70 will contact all axial slots 42a and axial slots 42b of inner ring 16 described above and below. Lubricating fluid 66 is disposed inside full annular slot 70.

As discussed above, axial width $W_B$ of bearing assembly 10 is the distance that bearing assembly 10 extends parallel to central axis CA. Axial width $W_E$ of bearing elements 18 is the distance bearing elements 18 extend parallel to central axis CA once bearing elements 18 have been assembled into bearing assembly 10. Axial width $W_B$ divided by axial width $W_E$ produces a ratio whose value is less than 2.

Once bearing assembly 10, annular manifold 64, and seal runner plate 68 are mounted around shaft 30 and bearing assembly 10 is rotatably actuated, full annular slot 70 of annular manifold 64 feeds lubricating fluid 66 into axial slots 42a and axial slots 42b (not shown) from second end 38. Axial slot 42a directs lubricating fluid 66 into partial circumferential slot 40a where all of lubricating fluid 66 is forced into radial hole 44a by centrifugal forces acting on bearing assembly 10. None of lubricating fluid 66 continues past partial circumferential slot 40a in axial slot 42a. Lubricating fluid 66 exits radial hole 44a onto outer surface 30 of inner ring 16 proximate first end 36 where lubricating fluid 66 lubricates outer surface 30, bearing element 18, bearing cage 20, inner race 34, and outer ring 14 (not shown). Along with assisting with the lubrication of bearing assembly 10, partial circumferential slot 40a prevents hoop stresses from concentrating in inner ring 16 further allowing bearing assembly 10 to rotate at higher speeds than bearing assemblies known in the prior art. Because the ratio between axial width $W_B$ of bearing assembly 10 and axial width $W_E$ of bearing elements 18 is less than 2, bearing assembly 10 uses less material than prior art bearing assemblies and will occupy less axial space on shaft 60 than would a prior art bearing assembly.

FIG. 5B is an expanded cross sectional side view of bearing assembly 10 of FIG. 1 mounted to shaft 60 adjacent seal runner plate 68. Bearing assembly 10 includes outer ring 14 (not shown), inner ring 16, bearing element 18, and bearing cage 20. Inner ring 16 includes outer surface 30, inner surface 32, inner race 34, first end 36, second end 38, partial circumferential slot 40b, axial slot 42a (shown in phantom), and radial hole 44b. Shaft 60 includes outer surface 62. Annular manifold 64 supplies lubricating fluid 66 to bearing assembly 10 and includes full annular slot 70. Seal runner plate 68 includes fluid passage 72.

Outer ring 14 (not shown), inner ring 16, bearing element 18, and bearing cage 20 are assembled into bearing assembly 10 according to the disclosure of the embodiment from FIG. 1. Inner race 34 is formed on outer surface 30 of inner ring 16 between first end 36 and second 38. Partial circumferential slot 40b is formed on inner surface 32 of inner ring 16 adjacent second end 38. Axial slot 42a is formed on inner surface 32 extending from first end 36 to second end 38 and intersects partial circumferential slot 40b. Radial hole 44b extends form outer surface 30 of inner ring 16 to partial circumferential slot 40b. Radial hole 44b and axial slot 42a are misaligned circumferentially, explaining why axial slot 42a is shown in phantom in FIG. 5A. Full annular slot 70 is formed on an inside surface of manifold 64 and extends axially into a portion of annular manifold 64. Full annular slot 70 is radially deeper than axial slot 42a and axial slot 42b (not shown). Bearing assembly 10 is mounted around shaft 60 with inner surface 32 of inner ring 16 contacting outer surface 62 of shaft 60. Seal runner plate 68 is mounted around shaft 60 adjacent bearing assembly 10. Annular manifold 64 is mounted around shaft 60 adjacent bearing assembly 10 opposite seal runner plate 68 with full annular slot 70 contacting second end 38 and axial slot 42a of inner ring 16. Full annular slot 70 will contact all axial slots 42a and axial slots 42b of inner ring 16 described above and below. Lubricating fluid 66 is disposed inside full annular slot 70.

Once bearing assembly 10, annular manifold 64, and seal runner plate 68 are mounted around shaft 30 and bearing assembly 10 is rotatably actuated, full annular slot 70 of annular manifold 64 feeds lubricating fluid 66 into axial slots 42a and axial slots 42b (not shown) from second end 38. Axial slot 42a directs lubricating fluid 66 into partial circumferential slot 40b where all of lubricating fluid 66 from axial slot 42a is forced into radial hole 44b by centrifugal forces acting on bearing assembly 10. None of lubricating fluid 66 continues past partial circumferential slot 40b in axial slot 42a. Lubricating fluid 66 exits radial hole 44b onto outer surface 30 of inner ring 16 proximate second end 38 where lubricating fluid 66 lubricates outer surface 30, bearing element 18, bearing cage 20, inner race 34, and outer ring 14 (not shown). Along with assisting with the lubrication of bearing assembly 10, partial circumferential slot 40b prevents hoop stresses from concentrating in inner ring 16 further allowing bearing assembly 10 to rotate at higher speeds than bearing assemblies known in the prior art.

Figure 5C:
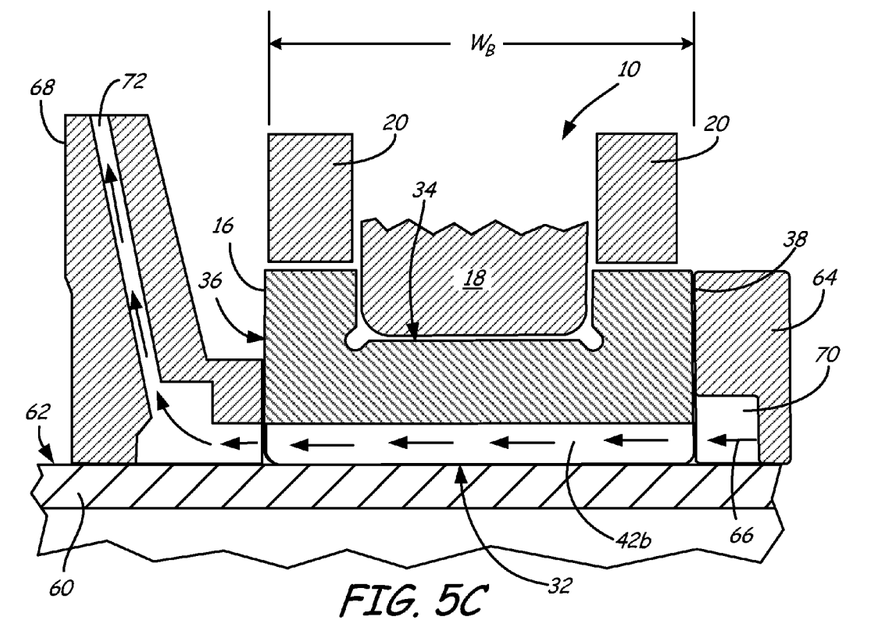
FIG. 5C is an expanded cross sectional side view of the bearing assembly of FIG. 1 mounted to the shaft of FIG. 5A adjacent a seal runner plate and lubricating fluid being directed underneath the bearing assembly and into the seal runner plate through an axial slot formed in an inner ring of the bearing assembly.

FIG. 5C is an expanded cross sectional side view of bearing assembly 10 of FIG. 1 mounted to shaft 60 adjacent seal runner plate 68. FIG. 5C is similar to FIGS. 5A and 5B, except FIG. 5C is circumferentially oriented on axial slot 42b. Bearing assembly 10 includes outer ring 14 (not shown), inner ring 16, bearing element 18, and bearing cage 20. Inner ring 16 includes outer surface 30, inner surface 32, inner race 34, first end 36, second end 38, and axial slot 42b. Shaft 60 includes outer surface 62. Annular manifold 64 supplies lubricating fluid 66 to bearing assembly 10 and includes full annular slot 70. Seal runner plate 68 includes fluid passage 72.

Outer ring 14 (not shown), inner ring 16, bearing element 18, and bearing cage 20 are assembled into bearing assembly 10 according to the disclosure of the embodiment from FIG. 1. Inner race 34 is formed on outer surface 30 of inner ring 16 between first end 36 and second 38. Axial slot 42b is formed on inner surface 32 extending from first end 36 to second end 38 and does not intersect partial circumferential slot 40a or partial circumferential slot 40b described above. Full annular slot 70 is formed on an inside surface of manifold 64 and extends axially into a portion of annular manifold 64. Full annular slot 70 is radially deeper than axial slot 42a and axial slot 42b (not shown). Bearing assembly 10 is mounted around shaft 60 with inner surface 32 of inner ring 16 contacting outer surface 62 of shaft 60. Seal runner plate 68 is mounted around shaft 60 adjacent bearing assembly 10. Annular manifold 64 is mounted around shaft 60 adjacent bearing assembly 10 opposite seal runner plate 68 with full annular slot 70 contacting second end 38 and axial slot 42a of inner ring 16. Full annular slot 70 will contact all axial slots 42a and axial slots 42b of inner ring 16 described above and below. Lubricating fluid 66 is disposed inside full annular slot 70.

Once bearing assembly 10, annular manifold 64, and seal runner plate 68 are mounted around shaft 30 and bearing assembly 10 is rotatably actuated, full annular slot 70 of annular manifold 64 feeds lubricating fluid 66 into axial slots 42a and axial slots 42b from second end 38. Axial slot 42b directs lubricating fluid 66 across inner surface 32 to first end 36 where lubricating fluid 66 exits axial slot 42b into fluid passage 72 of seal runner plate 68. Fluid passage 72 directs lubricating fluid 66 away from bearing assembly 10 to be used in other applications. While axial slot 42a discussed above enables lubricating fluid 66 to be directed into bearing assembly 10 to lubricate bearing assembly 10, axial slot 42b enables lubricating fluid 66 to be directed beneath and across inner ring 16 so that lubricating fluid 66 can be shared by other components of a larger assembly that incorporates bearing assembly 10.

In view of the foregoing description, it will be recognized that the present disclosure provides numerous advantages and benefits. For example, the present disclosure allows under race flow of lubricating fluid in bearing assembly 10 to be used to lubricate bearing assembly 10 while still directing some of the oil flow to components that mate with bearing assembly 10. Moreover, the present disclosure reduces the concentration of high centrifugal hoop stress in inner ring 16 of bearing assembly 10, thereby enabling higher bearing speeds and higher engine speeds that were not previously attainable by prior art bearing assemblies. Rotational bearings typically describe speed performance in terms of the product "DN" where "D" is the diameter (often in mm) of the bearing and "N" is the rotation rate in revolutions per minute. Prior art bearing assemblies utilized in gas turbine engines are typically limited to speeds no greater than 2.2 to 2.5 million DN. The present invention is capable of reaching speeds as high as 2.7 to 2.8 million DN. Moreover, the present disclosure is less complex than prior art bearing assemblies and does not require external features (such as oil jets, wings and scoops) to direct lubricating fluid into bearing assembly 10. Moreover, the present disclosure requires less material than prior art bearings and occupies less axial space on a shaft inside a gas turbine engine compartment than prior art bearings because the ratio ($W_B/W_E$) between axial width $W_B$ of bearing assembly 10 and axial width $W_E$ of bearing element 18 is less than 2. Axial space in a gas turbine engine compartment is a very costly commodity.

While the invention has been described with reference to exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A bearing assembly comprising:
    an outer ring having an outer surface and an inner surface, and an outer race formed on the inner surface;
    an inner ring having an outer surface and an inner surface, and an inner race formed on the outer surface of the inner ring;
    bearing elements disposed between the outer race and the inner race, and adapted to rotatably move between the inner ring and the outer ring about a central axis of the bearing assembly;
    a plurality of circumferentially spaced axial slots formed on the inner surface of the inner ring;
    a first set of circumferentially spaced partial circumferential slots formed on the inner surface of the inner ring adjacent a first end of the inner ring, each partial circumferential slot intersecting at least one of the axial slots; and
    a first set of radial holes, each radial hole extending from the outer surface of the inner ring to one of the partial circumferential slots.

2. The assembly of claim 1, wherein at least one of the axial slots does not intersect any of the partial circumferential slots.

3. The assembly of claim 1 further comprising:
    a second set of circumferentially spaced partial circumferential slots adjacent a second end of the inner ring, each partial circumferential slot intersecting at least one of the axial slots; and
    a second set of radial holes, each radial hole extending from the outer surface of the inner ring to one of the second set partial circumferential slots.

4. The assembly of claim 3, wherein the partial circumferential slots of the second set intersect axial slots not intersected by the partial circumferential slots of the first set.

5. The assembly of claim 3, wherein the axial slots extend from the first end of the inner ring to the second end of the inner ring.

6. The assembly of claim 1, wherein each of the partial circumferential slots extends across more of a circumference of the inner surface of the inner ring than each of the axial slots.

7. The assembly of claim 1, wherein the inner ring is configured to be mounted onto a shaft.

8. The assembly of claim 1, wherein each of the partial circumferential slots has a radial depth greater than a radial depth of the axial slots.

9. The assembly of claim 1, wherein each of the partial circumferential slots has a curved surface.

10. The assembly of claim 9, wherein the curved surface of the partial circumferential slots has a center of curvature offset from the central axis of the bearing assembly.

11. The assembly of claim 1, wherein an axial width of the bearing assembly is less than twice an axial width of the bearing elements.

12. The assembly of claim 1, wherein the axial slots are configured to be fluidly connected to a lubricating fluid source.

13. An inner ring of an under race lubricated bearing assembly comprising:
- an outer surface and an inner surface, and an inner race formed on the outer surface of the inner ring;
- a plurality of circumferentially spaced axial slots formed on the inner surface of the inner ring;
- a first set of circumferentially spaced partial circumferential slots formed on the inner surface of the inner ring adjacent a first end of the inner ring, each partial circumferential slot intersecting at least one of the axial slots; and
- a first set of radial holes, each radial hole extending from the outer surface of the inner ring to one of the partial circumferential slots.

14. The inner ring of claim 13, wherein the radial holes are circumferentially misaligned from the axial slots.

15. The inner ring of claim 13, wherein the partial circumferential slots are each wider circumferentially than the axial slots.

16. The inner ring of claim 13 further comprising:
- a second set of circumferentially spaced partial circumferential slots adjacent a second end of the inner ring, each partial circumferential slot intersecting at least one of the axial slots; and
- a second set of radial holes, each radial hole extending from the outer surface of the inner ring to one of the second set partial circumferential slots.

17. An inner ring of an under race lubricated bearing assembly comprising:
- an outer surface and an inner surface, and an inner race formed on the outer surface of the inner ring;
- a first axial slot formed on the inner surface of the inner ring;
- a first partial circumferential slot formed on the inner surface of the inner ring, the first partial circumferential slot intersecting the first axial slot, and the first partial circumferential slot being circumferentially wider than the first axial slot; and
- a first radial hole extending from the outer surface of the inner ring to the first partial circumferential slot.

18. The inner ring of claim 17 further comprising:
- a second axial slot formed on the inner surface of the inner ring;
- a second partial circumferential slot formed on the inner surface of the inner ring, the second partial circumferential slot intersecting the second axial slot, and the second partial circumferential slot being circumferentially wider than the second axial slot; and
- a second radial hole extending from the outer surface of the inner ring to the second partial circumferential slot.

19. The inner ring of claim 18, wherein the first partial circumferential slot is positioned adjacent a first end of the inner ring and the second circumferential slot is positioned adjacent a second end of the inner ring.

20. The inner ring of claim 18, wherein the first partial circumferential slot and the second partial circumferential slot are circumferentially spaced and are positioned adjacent a first end of the inner ring.

* * * * *